United States Patent
Maekawa et al.

(10) Patent No.: US 11,465,470 B2
(45) Date of Patent: Oct. 11, 2022

(54) VEHICLE LIGHT-ADJUSTING WINDOW AND VEHICLE LIGHT-ADJUSTING WINDOW SYSTEM

(71) Applicants: TOYOTA BOSHOKU KABUSHIKI KAISHA, Aichi (JP); KYUSYU NANOTEC OPTICS CO., LTD., Oita (JP)

(72) Inventors: Motoki Maekawa, Aichi (JP); Masahiro Irie, Aichi (JP); Mitsutaka Sako, Aichi (JP); Junichi Baba, Oita (JP)

(73) Assignees: TOYOTA BOSHOKU KABUSHIKI KAISHA, Aichi (JP); KYUSYU NANOTEC OPTICS CO., LTD., Oita (JP)

( * ) Notice: Subject to any disclaimer, the term of this patent is extended or adjusted under 35 U.S.C. 154(b) by 104 days.

(21) Appl. No.: 17/065,263

(22) Filed: Oct. 7, 2020

(65) Prior Publication Data

US 2021/0107339 A1  Apr. 15, 2021

(30) Foreign Application Priority Data

Oct. 10, 2019  (JP) .............................. JP2019-186744

(51) Int. Cl.
| | | |
|---|---|---|
| *B60J 3/04* | (2006.01) | |
| *G02F 1/1334* | (2006.01) | |
| *G02F 1/137* | (2006.01) | |
| *G02F 1/163* | (2006.01) | |
| *G02F 1/1685* | (2019.01) | |
| *G02F 1/157* | (2006.01) | |
| *G02F 1/1677* | (2019.01) | |
| *G02F 1/1335* | (2006.01) | |
| *G02F 1/1503* | (2019.01) | |
| *B60K 35/00* | (2006.01) | |

(52) U.S. Cl.
CPC ................ *B60J 3/04* (2013.01); *G02F 1/137* (2013.01); *G02F 1/1334* (2013.01); *G02F 1/133553* (2013.01); *G02F 1/1503* (2019.01); *G02F 1/157* (2013.01); *G02F 1/163* (2013.01); *G02F 1/1677* (2019.01); *G02F 1/1685* (2019.01); *B60K 35/00* (2013.01); *B60K 2370/1529* (2019.05); *B60K 2370/23* (2019.05); *B60K 2370/66* (2019.05); *G02F 1/13345* (2021.01)

(58) Field of Classification Search
None
See application file for complete search history.

(56) References Cited

U.S. PATENT DOCUMENTS

2019/0329529 A1  10/2019  Schulz et al.

FOREIGN PATENT DOCUMENTS

| CA | 3009453 | * | 9/2017 |
|---|---|---|---|
| JP | 2019-511987 | | 5/2019 |

* cited by examiner

*Primary Examiner* — Ashok Patel
(74) *Attorney, Agent, or Firm* — Greenblum & Bernstein, P.L.C.

(57) ABSTRACT

A vehicle light-adjusting window and a vehicle light-adjusting window system capable of clearly projecting a video are provided. A vehicle light-adjusting window includes a transparent plate, a first conductive film, a light-adjusting layer, a second conductive film, and a projection film, which are arranged in this order.

20 Claims, 9 Drawing Sheets

VEHICLE LIGHT-ADJUSTING WINDOW AND VEHICLE LIGHT-ADJUSTING WINDOW SYSTEM

CROSS-REFERENCE TO RELATED APPLICATION

The present disclosure relates to a vehicle light-adjusting window and a vehicle light-adjusting window system. This application is based on Japanese Patent Application No. 2019-186744 filed on Oct. 10, 2019, and claims the benefit of its priority. All contents of such patent application will be incorporated herein by reference.

BACKGROUND OF THE INVENTION

Various displays are known as equipment for showing to passengers in a vehicle. For example, a composite pane for a head-up display is known (see Japanese Translation of PCT International Application Publication No. 2019-511987). It is also conceivable to project the video on the window of the vehicle.

However, when projected on a conventional window, the video was not always clear.

The present disclosure has been made in view of the above circumstances, and an object of the present disclosure is to provide a vehicle light-adjusting window and a vehicle light-adjusting window system capable of projecting a video clearly. The present disclosure can be realized as the following modes.

SUMMARY OF THE INVENTION

A vehicle light-adjusting window including:
a transparent plate;
a first conductive film;
a light-adjusting layer;
a second conductive film; and
a projection film,
which are arranged in this order.

According to the present disclosure, a video can be projected clearly.

DETAILED DESCRIPTION

Here, a desirable example of the present disclosure will be described.

The vehicle light-adjusting window in which the first conductive film is formed on a first resin film.

According to this configuration, a vehicle light-adjusting window that is cost effective can be provided.

The vehicle light-adjusting window in which the second conductive film is formed on a second resin film.

According to this configuration, a vehicle light-adjusting window that is cost effective can be provided.

The vehicle light-adjusting window in which the second conductive film and the projection film are integrated, and the second conductive film is formed on the projection film.

According to this configuration, a vehicle light-adjusting window having a simple structure can be provided.

The vehicle light-adjusting window further including a reflective film arranged between the transparent plate and the first conductive film.

According to this configuration, the projected video becomes clearer.

A vehicle light-adjusting window system including a vehicle light-adjusting window and a projector, in which the transparent plate is arranged on an outdoor side and the projection film is arranged on an indoor side; and a video is projected onto the projection film by the projector.

According to the vehicle light-adjusting window system, a video can be projected clearly.

1. Vehicle Light-Adjusting Window 1

A vehicle light-adjusting window 1 includes a transparent plate 3, a first conductive film 5, a light-adjusting layer 7, a second conductive film 9, and a projection film 11, which are arranged in this order.

1.1 Vehicle Light-Adjusting Window 1 of a First Embodiment

Figure 1:
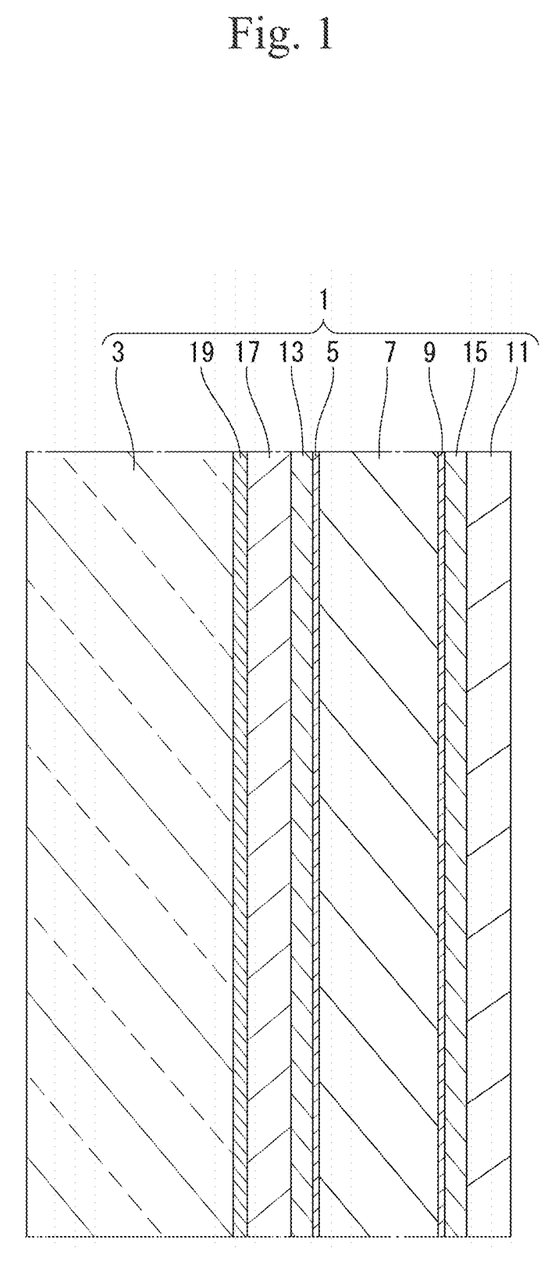
FIG. 1 is a cross-sectional view of a vehicle light-adjusting window of a first embodiment.
Figure 2:
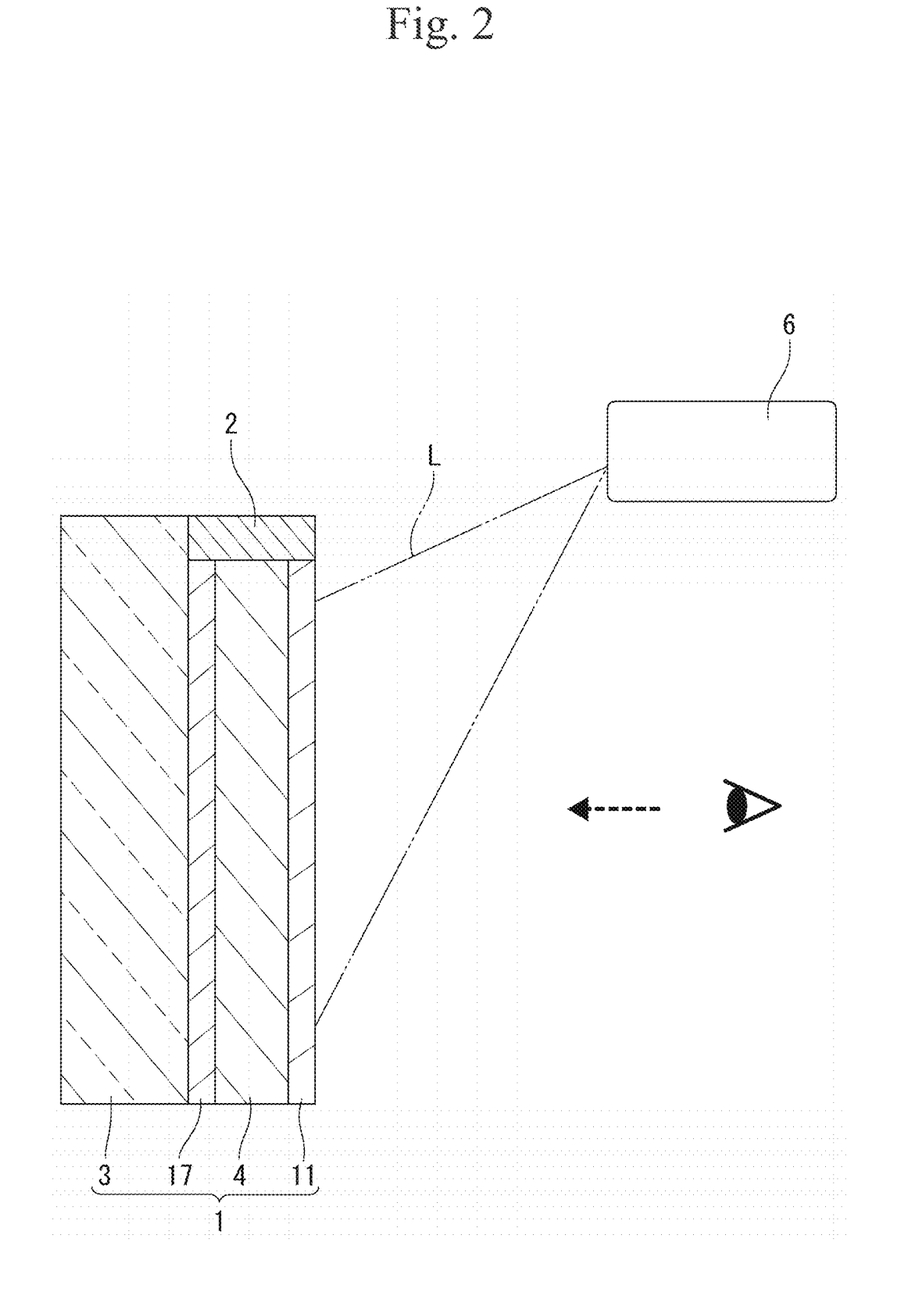
FIG. 2 is a conceptual diagram showing a vehicle light-adjusting window system.

The vehicle light-adjusting window 1 of the first embodiment will be described (see FIG. 1). The vehicle light-adjusting window 1 includes a transparent plate 3, an adhesive film 19 (arbitrary component), a reflective film 17 (arbitrary component), a first resin film 13 (arbitrary component), a first conductive film 5, a light-adjusting layer 7, a second conductive film 9, a second resin film 15 (arbitrary component), and a projection film 11, which are arranged in this order. Each component will be described below. A unit of the first resin film 13 (arbitrary component), the first conductive film 5, the light-adjusting layer 7, the second conductive film 9, and the second resin film 15 (arbitrary component) is a light-adjusting film 4. FIG. 2 shows a conceptual diagram of an example in which the vehicle light-adjusting window 1 is applied to a vehicle. In FIG. 2, reference numerals are denoted to the main components. In FIG. 2, a sealing material 2 is also shown. In this figure, the vehicle light-adjusting window 1 divides the vehicle interior (right side of the vehicle light-adjusting window 1 of FIG. 2) and the vehicle exterior (left side of the vehicle light-adjusting window 1 of FIG. 2). This figure shows a state in which a video is projected on a projection film 11 of the vehicle light-adjusting window 1 by a projector 6 in the vehicle compartment. The video includes both still videos and moving videos.

(1) Transparent Plate 3

The material of the transparent plate 3 is not particularly limited. As the material of the transparent plate 3, a transparent resin glass such as polycarbonates, polystyrenes, polymethylmethacrylates and the like, and an inorganic glass, which can be used alone or a stacked body of two or more of these can be used.

The thickness of the transparent plate 3 is not particularly limited. The thickness of the transparent plate 3, with respect to the lower limit value, is preferably 0.5 mm or more, more preferably 1.0 mm or more, and further preferably 3.0 mm or more, from the viewpoint of ensuring the strength of the vehicle light-adjusting window 1 while enabling the outside of the vehicle to be easily seen from the inside of the vehicle. From a similar viewpoint, the upper limit value is preferably 20.0 mm or less, more preferably 10.0 mm or less, and further preferably 7.0 mm or less. That is, the thickness of the transparent plate 3 is preferably 0.5 mm to 20.0 mm, more preferably 1.0 mm to 10.0 mm, and further preferably 3.0 mm to 7.0 mm.

(2) First Conductive Film 5

Examples of the material of the first conductive film 5 include Ag, Cu, and metal oxides, but the material is not limited to these. These materials can be used alone or in combination of two or more. The first conductive film 5 functions as a transparent electrode.

Examples of metal oxides include ITO ($In_2O_3$:Sn), ATO ($SnO_2$:Sb), FTO ($SnO_2$:F), AZO (ZnO:Al), and GZO (ZnO:Ga). For the first conductive film 5, for example, organic substances such as polythiophene, polyacetylene, polyaniline, and polypyrrole can be used. An example of the polythiophene-based compound is PEDOT (Polyethylenedioxythiophene).

The thickness of the first conductive film 5 is not particularly limited.

The first conductive film 5 is preferably formed on the first resin film 13. As the first resin film 13, from the viewpoint of enabling the outside of the vehicle to be easily seen from the inside of the vehicle, a polyester-based film, a polycarbonate-based film, a polystyrene-based film, a polyphenylene sulfide-based film, and a cycloolefin polymer-based film, which can be used alone or a stacked body of two or more of these can be used.

As a polyester constituting the polyester film, for example, one or more types of polyester such as polyethylene terephthalate, polyethylene isophthalate, polybutylene terephthalate, and polyethylene-2,6-naphthalene dicarboxylate, or the like can be suitably exemplified.

The thickness of the first resin film 13, with respect to the lower limit value, is preferably 5 μm or more, more preferably 25 μm or more, and further preferably 50 μm or more, from the viewpoint of sufficiently supporting the first conductive film 5 while enabling the outside of the vehicle to be easily seen from the inside of the vehicle. From a similar viewpoint, the upper limit value is preferably 200 μm or less, more preferably 125 μm or less, and further preferably 100 μm or less. That is, the thickness of the first resin film 13 is preferably 5 μm to 200 μm, more preferably 25 μm to 125 μm, and further preferably 50 μm to 100 μm.

(3) Light-Adjusting Layer 7

The type of the light-adjusting layer 7 is not particularly limited. The light-adjusting layer 7 changes in shade of color by the action of electricity, or changes between coloring and transparency. As the light-adjusting layer 7, there is suitably exemplified (1) a light-adjusting layer 7 using an EC (Electro chromic) method, (2) a light-adjusting layer 7 using an SPD (Suspended Particle Device) method, (3) a light-adjusting layer 7 using liquid crystals of VA (Vertical Alignment) method, TN (Twisted Nematic) method or IPS (In-Place-Switching) method. As a specific example, there is exemplified a light-adjusting layer 7 that has a structure in which liquid crystal molecules are enclosed inside and that is located between the first conductive film 5 which transmits light and the second conductive film 9 which transmits light. The light-adjusting layer 7 may perform light adjusting between black and transparent and may perform light adjusting between milky white and transparent, which depends on, for example, the type of pigment contained. Considering the contrast, the light-adjusting layer 7 that perform light adjusting between black and transparent is preferable.

In the light-adjusting layer 7 using the EC method, the color of the light-adjusting layer 7 changes between transparent and dark blue by utilizing a redox reaction, according to the potential difference between the electrodes.

The light-adjusting layer 7 using the SPD method is usually colored in dark blue using the orientation of fine particles, but changes to transparent when voltage is applied, and returns to the original dark blue when the voltage is turned off. Thus, the shading can be adjusted by the voltage.

Further, the light-adjusting layer 7 using the PDLC (Polymer Dispersed Liquid Crystal) method may be used. The light-adjusting layer 7 using the PDLC method has a network structure made of a special polymer formed in the liquid crystal layer, wherein a state in which an array of liquid crystal molecules is irregular is induced by the action of the polymer network, so that light is scattered. When a voltage is applied to array the liquid crystal molecules in the direction of the electric field, light is not scattered so that a transparent state is obtained. Specifically, the liquid crystal layer serving as the light-adjusting layer 7 includes PDLC (polymer dispersed liquid crystal). Such a liquid crystal layer can be switched between a transmissive (transparent) state and a scattering state by the intensity of the applied electric field. The PDLC includes a polymer portion and a liquid crystal portion, and can be formed of, for example, a mixture of a polymer precursor such as a liquid crystalline monomer and a liquid crystal molecule. To form the PDLC, the mixture is irradiated with energy such as ultraviolet light while the mixture is oriented with an oriented film, to polymerize the liquid crystalline monomer. Then, the liquid crystalline monomer is polymerized while maintaining the orientation, thus becoming a polymer portion having an orientation restricting force. The liquid crystal molecules are phase-separated from the polymer portion to form the liquid crystal portion, and are oriented by the orientation restricting force of the polymer portion. The PDLC included in the liquid crystal layer may be either a normal type or a reverse type. In the normal type, the liquid crystal layer is in an opaque state (scattering state) in a voltage non-applied state, and is in a transmissive state in a voltage applied state. The opacity (scattering degree) in the opaque state (scattering state) changes depending on the magnitude of the voltage applied between the first conductive film 5 and the second conductive film 9 serving as the transparent electrodes, and the opacity (scattering degree) increases as the voltage applied between the first conductive film 5 and the second conductive film 9 decreases. In the case of the reverse type, the liquid crystal layer is in a transmissive state having transmissivity in a voltage non-applied state in which no voltage is applied between the pair of transparent electrodes, that is, the first conductive film 5 and the second conductive film 9, and in an opaque state (scattering state) in a voltage applied state in which voltage is applied between the pair of transparent electrodes, that is, the first conductive film 5 and the second conductive film 9. The opacity (scattering degree) in the opaque state (scattering state) changes depending on the magnitude of the voltage applied between the first conductive film 5 and the second conductive film 9, and the opacity (scattering degree) increases as the voltage applied between the first conductive film 5 and the second conductive film 9 increases.

(4) Second Conductive Film 9

The material of the second conductive film 9 may be the same as the material of the first conductive film 5. The second conductive film 9 functions as a transparent electrode.

The thickness of the second conductive film 9 is not particularly limited.

The second conductive film 9 is preferably formed on the second resin film 15. As the second resin film 15, from the viewpoint of enabling the outside of the vehicle to be easily seen from the inside of the vehicle, a polyester-based film, a polycarbonate-based film, a polystyrene-based film, a polyphenylene sulfide-based film, and a cycloolefin polymer-based film, which can be used alone or a stacked body of two or more of these can be used.

As a polyester constituting the polyester film, for example, one or more types of polyester such as polyethylene terephthalate, polyethylene isophthalate, polybutylene terephthalate, and polyethylene-2,6-naphthalene dicarboxylate, or the like can be suitably exemplified.

The thickness of the second resin film 15, with respect to the lower limit value, is preferably 10 μm or more, more preferably 25 μm or more, and further preferably 50 μm or more, from the viewpoint of sufficiently supporting the second conductive film 9 while enabling the outside of the vehicle to be easily seen from the inside of the vehicle. From a similar viewpoint, the upper limit value is preferably 600 μm or less, more preferably 125 μm or less, and further preferably 100 μm or less. That is, the thickness of the first resin film 13 is preferably 10 μm to 600 μm, more preferably 25 μm to 125 μm, and further preferably 50 μm to 100 μm.

(5) Projection Film 11

The projection film 11 functions as a screen having a display surface capable of displaying the video projected by the projector 6.

The haze (JIS K7136) of the projection film 11 is not particularly limited. The haze of the projection film 11, with respect to the upper limit value, is preferably 20% or less, more preferably 15% or less, and further preferably 12% or less, from the viewpoint of enabling the outside of the vehicle to be easily seen from the inside of the vehicle. The lower limit value is preferably 1% or more, more preferably 2% or more, and further preferably 5% or more, from the viewpoint of clearly projecting a video. That is, the haze of the projection film 11 is preferably 1% to 20%, more preferably 2% to 15%, and further preferably 5% to 12%.

The total light transmittance (JIS K736-1) of the projection film 11 is not particularly limited. The total light transmittance of the projection film 11, with respect to the lower limit value, is preferably 70% or more, more preferably 75% or more, and further preferably 80% or more, from the viewpoint of enabling the outside of the vehicle to be easily seen from the inside of the vehicle. The upper limit value is not particularly limited, but usually, is preferably 95% or less, more preferably 93% or less, and further preferably 90% or less. That is, the total light transmittance of the projection film 11 is preferably 70% to 95%, more preferably 75% to 93%, and further preferably 80% to 90%.

As the projection film 11, for example, "KALEIDO SCREEN (registered trademark)" (manufactured by KIC Corporation), which is a transparent film screen, can be suitably used. The transparent film screen is made of, for example, a transparent resin film in which inorganic substances are dispersed. Other transparent film screens include, for example, a transparent resin film in which nano-diamonds are dispersed. As the transparent resin film, for example, a polyester-based film, a polycarbonate-based film, a polystyrene-based film, a polyphenylene sulfide-based film, or a cycloolefin polymer-based film can be used.

The thickness of the projection film 11 is not particularly limited. The thickness of the projection film 11 is, for example, 50 μm to 110 μm.

(6) Reflective Film 17

The vehicle light-adjusting window 1 may include a reflective film 17 between the transparent plate 3 and the first conductive film 5. Of course, the vehicle light-adjusting window 1 does not need to include the reflective film 17 between the transparent plate 3 and the first conductive film 5. When the video light L emitted from the projector 6 passes through the light-adjusting layer 7 and leaks, the reflective film 17 reflects the leaked light, serving as a backlight, and functions to make the video clear. The reflective film 17 also reflects outside light entering the inside of the vehicle from the outside of the vehicle.

The reflective film 17 is not particularly limited.

The visible light transmittance of the reflective film 17 is preferably 60% to 80%, and more preferably 65% to 75%. The visible light transmittance is the measurement result of linear transmittance by an angle variable transmissometer. The film is attached to the transparent float glass (thickness of 3 mm) for measurement. The measurement method is based on JIS A 5759:2016.

The visible light reflectance of the reflective film 17 is preferably 10% to 20%, and more preferably 14% to 18%. The visible light reflectance is measured in a wavelength range of 400 to 700 nm by irradiating the reflective film 17 with light using an ultraviolet visible near infrared (UV-Vis-NIR) spectrophotometer (e.g., Shimadzu UV-3101PC type), and the integrated visible light reflectance is calculated based on JIS A5759.

The thickness of the reflective film 17 is not particularly limited. The thickness of the reflective film 17 is, for example, 50 μm to 150 μm.

As the reflective film 17, for example, "LOW-E70 (product name)" of Scotch Tint™ window film (manufactured by 3M Japan Limited) can be suitably used.

(7) Adhesive Film 19

When transparent resin glass is used as the material of the transparent plate 3, an adhesive film 19 may be attached to the transparent plate 3 in order to solve the problem such as swelling due to outgas generated from the transparent resin glass. The adhesive film 19 has gas permeability in the base film and the adhesive. For example, "VENTI-LABEL (product name)" (manufactured by Lintec Corporation) can be used.

1.2 Vehicle Light-Adjusting Window 101 of a Second Embodiment

Figure 3:
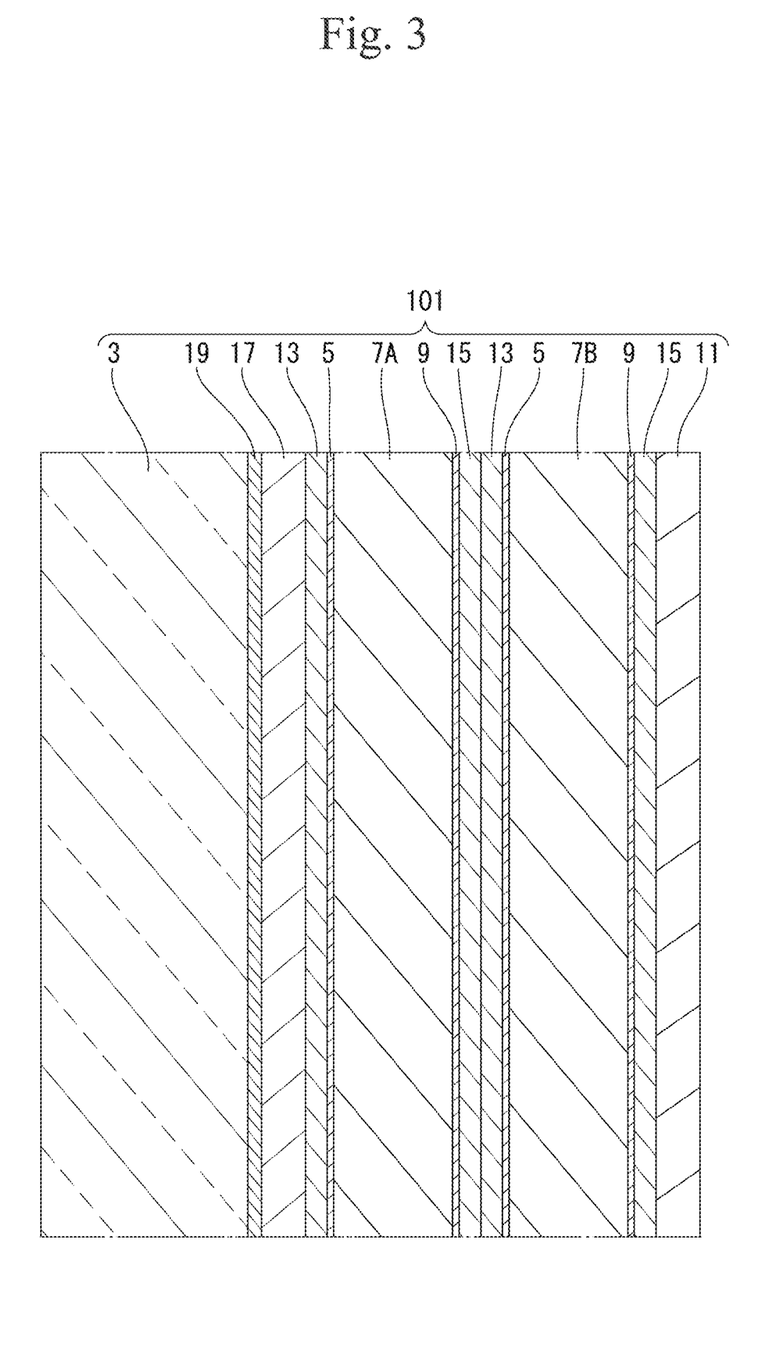
FIG. 3 is a cross-sectional view of a vehicle light-adjusting window of a second embodiment.

A vehicle light-adjusting window 101 of the second embodiment will be described (see FIG. 3). In the vehicle light-adjusting window 101 of the second embodiment, two light-adjusting films 4, each including a unit of a first resin film 13 (arbitrary component), a first conductive film 5, a light-adjusting layer 7, a second conductive film 9, and a second resin film 15 (arbitrary component), are overlapped. Specifically, this vehicle light-adjusting window 101 has a transparent plate 3, an adhesive film 19 (arbitrary component), a reflective film 17 (arbitrary component), a first resin film 13 (arbitrary component), a first conductive film 5, a light-adjusting layer 7A, a second conductive film 9, a second resin film 15 (arbitrary component), a first resin film 13 (arbitrary component), a first conductive film 5, a light-adjusting layer 7B, a second conductive film 9, a second resin film 15 (arbitrary component), and a projection film 11 arranged in this order.

Each component is the same as the vehicle light-adjusting window 1 of the first embodiment, and the same reference numerals are denoted on the same components, so that the description of the structure, operation, and effect will be omitted.

In the vehicle light-adjusting window 101 of the second embodiment, the two light-adjusting layers 7A and 7B may have the same configuration or different configurations. In a case where the configuration is different, one of the two light-adjusting layers 7A and 7B may be changed between black and transparent, and the other may be changed between milky white and transparent. Preferably, the light-adjusting layer 7A which is closer to the transparent plate 3 (left side in FIG. 3) is changed between black and transparent, and the light-adjusting layer 7B which is farther from the transparent plate 3 (right side in FIG. 3) is changed between milky white and transparent. This is because the video projected on the projection film 11 becomes clearer with such a configuration.

1.3 Vehicle Light-Adjusting Window 103 of a Third Embodiment

Figure 4:
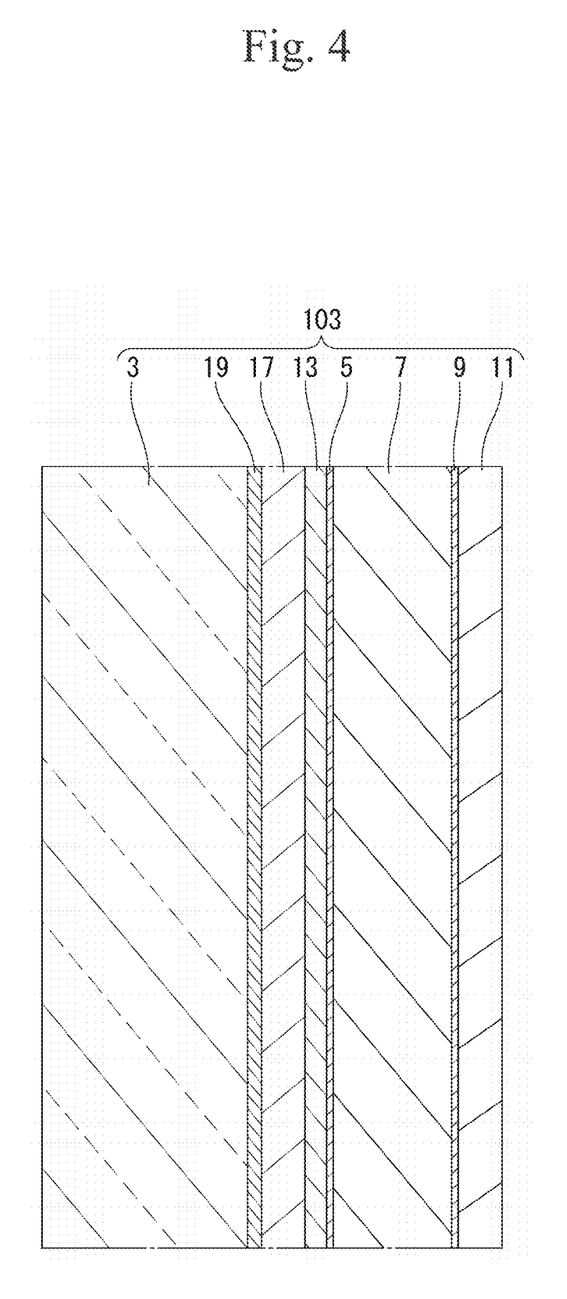
FIG. 4 is a cross-sectional view of a vehicle light-adjusting window of a third embodiment.

A vehicle light-adjusting window 103 of the third embodiment will be described (see FIG. 4). The vehicle light-adjusting window 103 of the third embodiment is different from the vehicle light-adjusting window 1 of the first embodiment of FIG. 1 in that a second resin film 15 is not provided. A second conductive film 9 is formed on a projection film 11. Others are the same as those of the vehicle light-adjusting window 1 of the first embodiment, and the same reference numerals are denoted on the same components, so that the description of the structure, operation, and effect will be omitted. According to the configuration of the third embodiment, the vehicle light-adjusting window 103 having a simple structure can be provided.

2. Vehicle Light-Adjusting Window System 201

A vehicle light-adjusting window system 201 includes the vehicle light-adjusting windows 1, 101, 103 and a projector 6. The transparent plate 3 is arranged on the outdoor side, and the projection film 11 is arranged on the indoor side (see FIGS. 2 and 5). The vehicle light-adjusting window system 201 projects a video (image) on the projection film 11 by the projector 6.

The projector 6 is not particularly limited as long as it can display a video on the projection film 11. The projector 6 may be an illumination projection type projector which enlarges and projects a video on the projection film 11, or may be a scanning type projector which scans light and forms a video on the projection film 11. The brightness of the projector is not particularly limited. From the viewpoint of clearly displaying a video, the brightness of the projector 6 is preferably 600 lumens or more.

The installing location of the projector 6 is not particularly limited. For example, the projector 6 can be installed on the ceiling, the floor, or the door of the vehicle.

Figure 5:
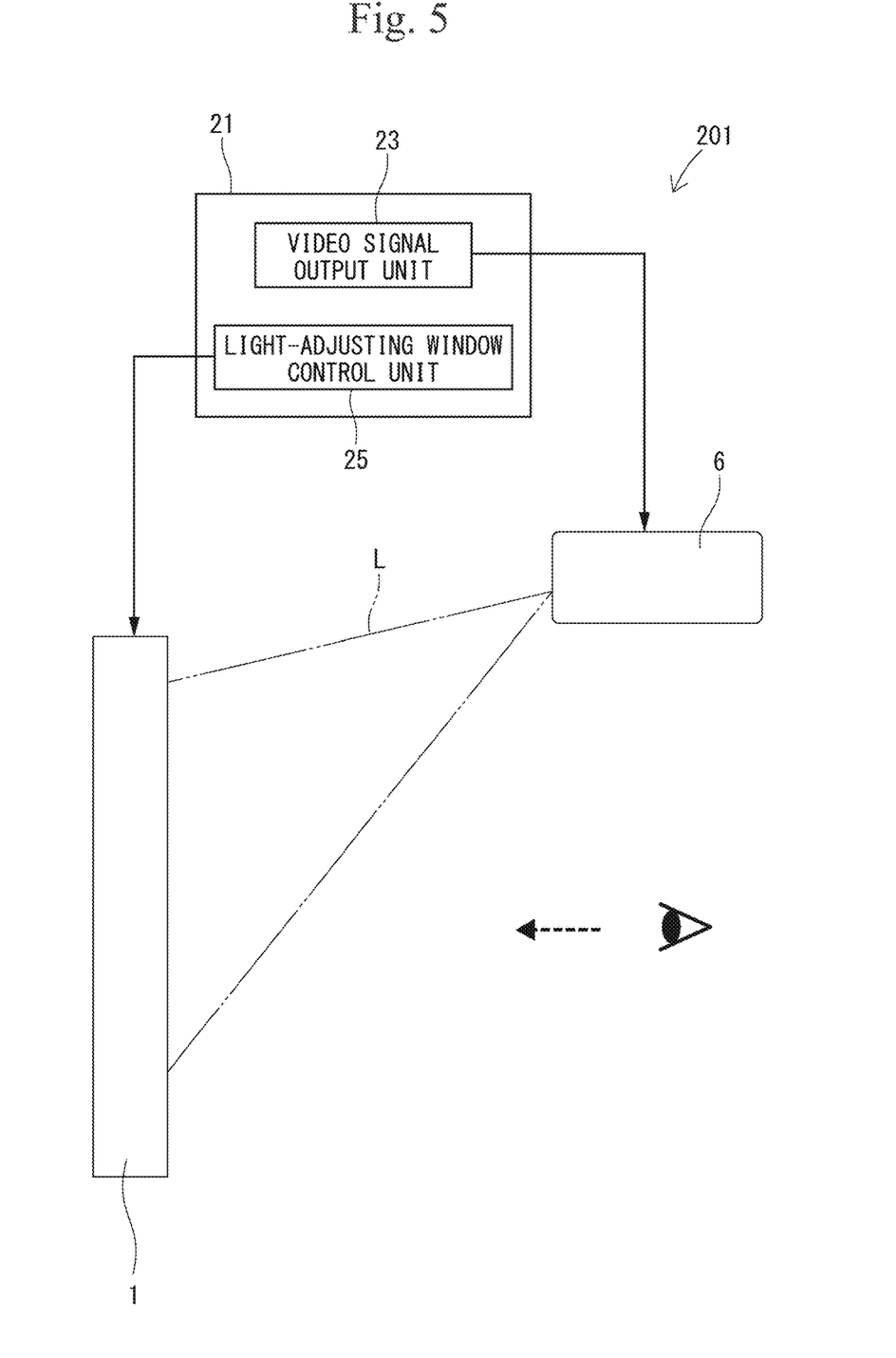
FIG. 5 is a block diagram showing an overall configuration of a vehicle light-adjusting window system.

The vehicle light-adjusting window system 201 preferably includes a control unit 21 as shown in FIG. 5. As shown in FIG. 5, the control unit 21 includes a video signal output unit 23 which outputs a video signal to the projector 6, and a light-adjusting window control unit 25 which controls driving (ON/OFF) of the vehicle light-adjusting window 1. Upon receiving the video signal from the video signal output unit 23, the projector 6 emits the video light L based on the video signal. The control unit 21 includes a CPU (Central Processing Unit), a memory (e.g., a ROM (Read Only Memory), a RAM (Random Access Memory)), and the like. The video formed by the video light L is not particularly limited. For example, a video of an advertisement, a video of a movie, a video of a game, a video related to navigation information, a video related to entertainment information, and the like are exemplified.

The control unit 21 is configured to control the driving of the vehicle light-adjusting window 1 by the light-adjusting window control unit 25 in correspondence with the output of the video signal from the video signal output unit 23 to the projector 6. Specifically, the control unit 21 causes the vehicle light-adjusting window 1 to be in a transmissive state (transparent) by the light-adjusting window control unit 25 in a state where the video signal is not output from the video signal output unit 23. On the other hand, in a state where the video signal is output from the video signal output unit 23, the control unit 21 causes the vehicle light-adjusting window 1 to be in an opaque state by the light-adjusting window control unit 25. Further, AR (augmented reality) may be realized by causing the vehicle light-adjusting window 1 to be in a transparent state while the projector 6 is emitting the video light L. Specifically, the actual landscape seen outside through the vehicle light-adjusting window 1 and the video formed by the video light L may be superimposed.

The light-adjusting window control unit 25 changes the opacity of the vehicle light-adjusting window 1 by the magnitude of the voltage applied between the first conductive film 5 and the second conductive film 9.

The degree of opacity can be represented by, for example, a haze value. The haze value is a value representing the degree of haze (ratio of scattered light with respect to total transmitted light), and means higher transmittance (higher transparency) the smaller the value. Such a haze value (%) can be calculated by Td/Tt×100 (Td: diffuse transmittance, Tt: total light transmittance).

Figure 6:
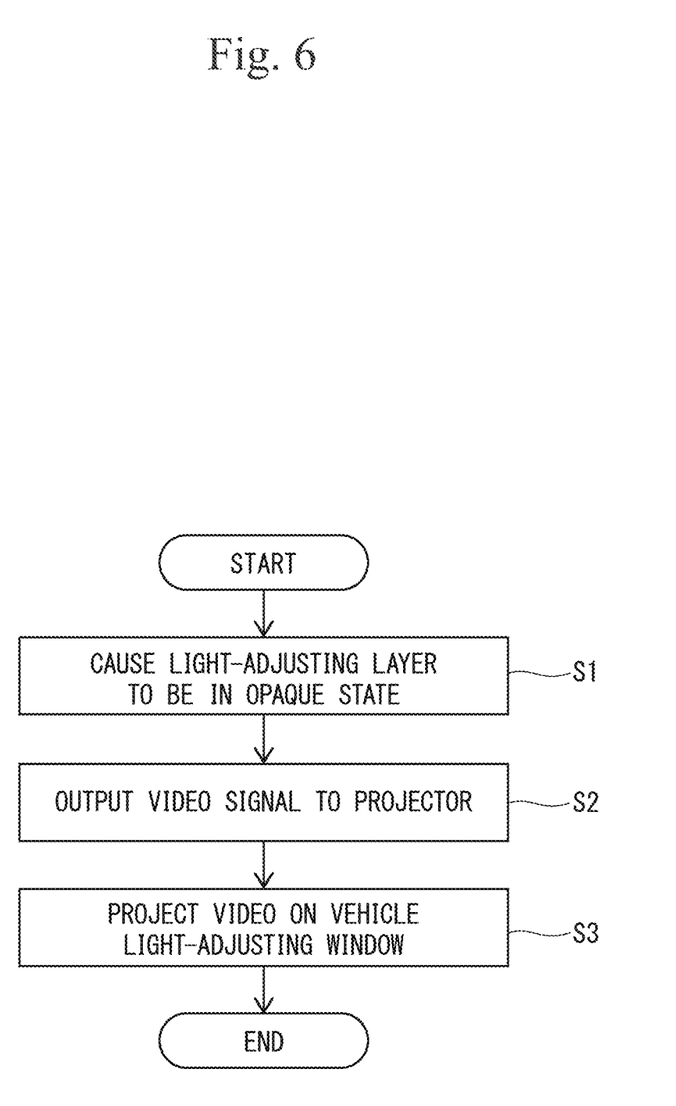
FIG. 6 is a flowchart illustrating an example of a processing procedure of the vehicle light-adjusting window system.
Figure 7:
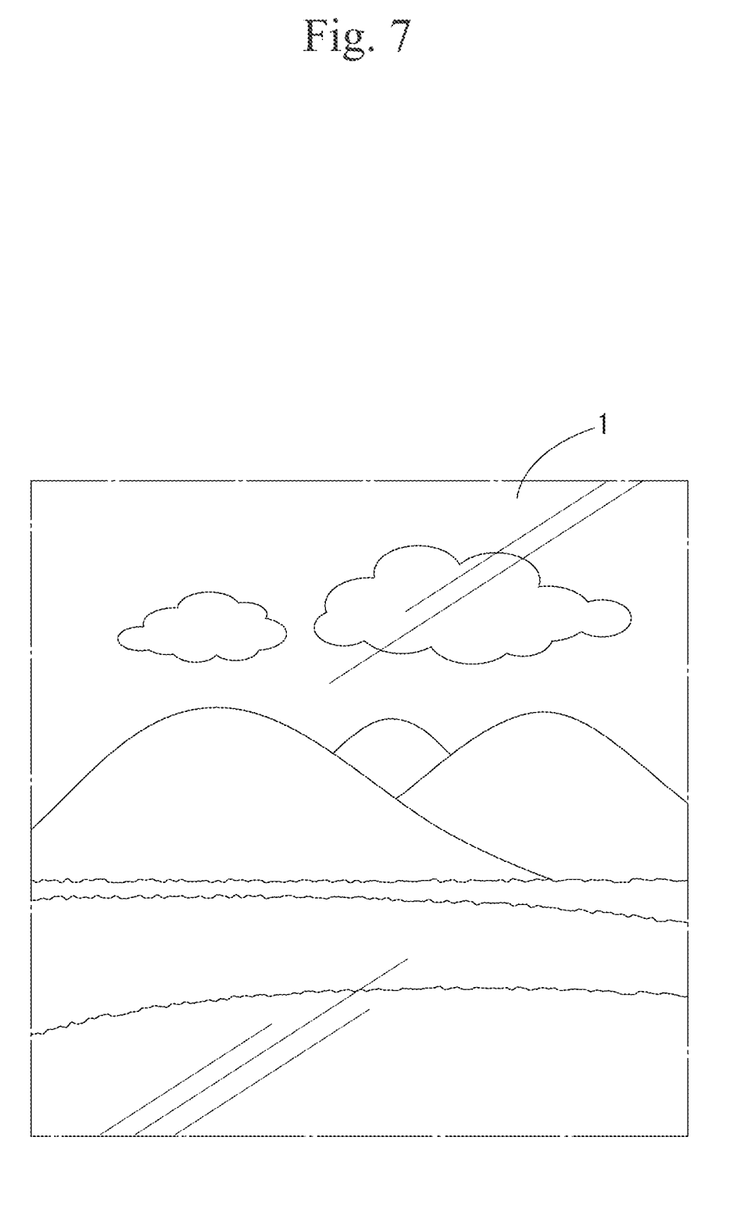
FIG. 7 is an explanatory view showing a state in which the vehicle light-adjusting window is transparent.
Figure 8:
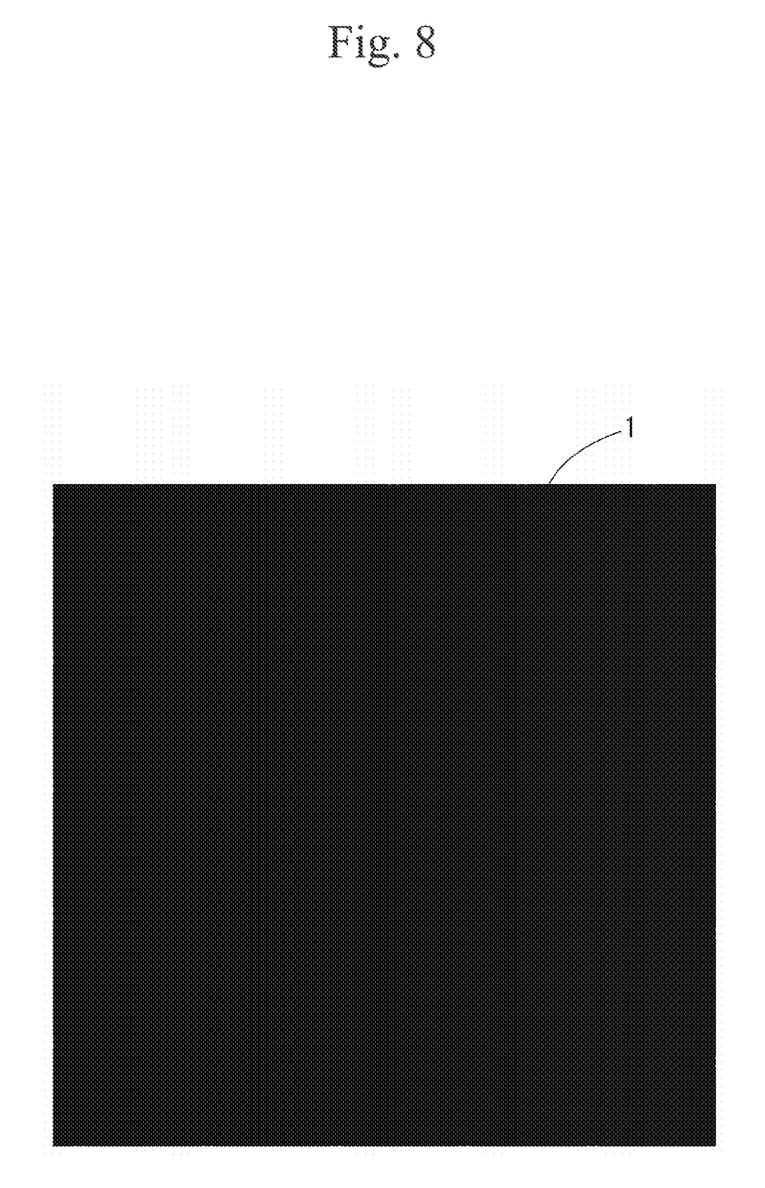
FIG. 8 is an explanatory view showing a state in which the vehicle light-adjusting window is opaque.
Figure 9:
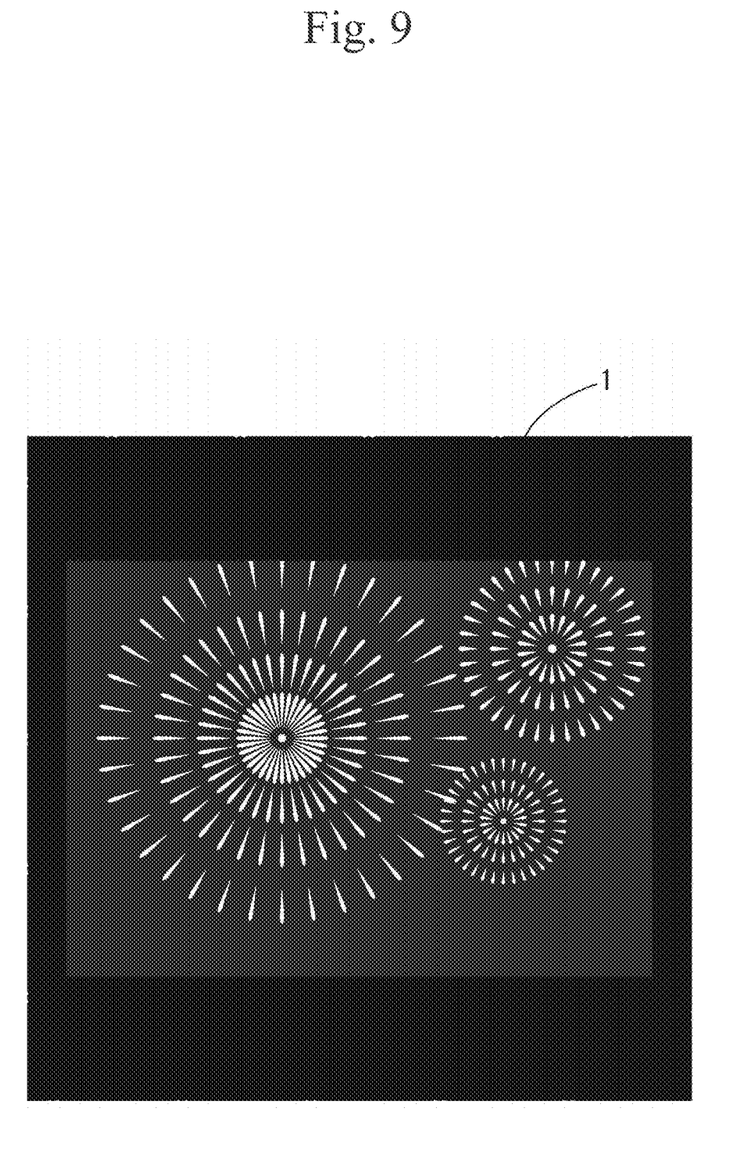
FIG. 9 is an explanatory view showing a state in which a video is projected on an opaque vehicle light-adjusting window.

FIG. 6 is a flowchart illustrating an example of a processing procedure of the vehicle light-adjusting window system 201. This operation program is stored in a ROM or the like in the control unit 21, and is executed by the CPU. A specific example of the processing procedure will be described. In a state where no video is projected, the light-adjusting window control unit 25 of the control unit 21 controls the light-adjusting layer 7 to be in the transparent state (see FIG. 7). When projecting a video, the light-adjusting window control unit 25 of the control unit 21 causes the light-adjusting layer 7 to be in an opaque state (step S1, see FIG. 8). The video signal output unit 23 of the control unit 21 outputs the video signal to the projector 6 (step 2). The projector 6 emits the video light L based on the video signal to the projection film 11 and projects the video on the vehicle light-adjusting window 1 (step 3, see FIG. 9).

The operations and effects of the present embodiment will be described. Conventionally, when the video light L is emitted to the projection film 11, the video cannot be displayed clearly due to reasons such as a part of the video light L is transmitted through the projection film 11. Furthermore, conventionally, if the projection film 11 is transparent, a situation can be seen from outside the vehicle while the occupant is watching the video, which is a problem from the viewpoint of privacy.

In the vehicle light-adjusting window 1 of the present embodiment, the video light L is emitted to the projection film 11 arranged in front of the light-adjusting layer 7 while the light-adjusting layer 7 behind the projection film 11 is made to be in an opaque state. According to this configuration, the video can be displayed more clearly than in a conventional one. Furthermore, since the light-adjusting layer 7 is in an opaque state, while the occupant is watching the video, it is difficult to see the situation from outside the vehicle, which is preferable from the viewpoint of privacy.

Although the conventional light-adjusting window has high privacy, it is not suitable for projecting a video due to the reflection to the light source. On the other hand, in the vehicle light-adjusting window 1 of the present embodiment, since the light is projected on the projection film 11, the reflection to the light source is suppressed more than a conventional one.

Conventional advertisements cannot be effectively advertised because the advertisement content and display position are limited. In the vehicle light-adjusting window 1 of the present embodiment, the projector 6 projects the video on the projection film 11, and thus the advertisement content can be easily changed according to the needs of the opponent to appeal to (passenger, pedestrian (in the case of other embodiment (2) described later) etc.), and the display position can also be easily changed. Therefore, the vehicle light-adjusting window 1 of the present embodiment has a high advertising effect.

The foregoing examples are merely for illustrative purposes and are not to be construed as limiting the invention. Although the present invention has been described with reference to exemplary embodiments, it is to be understood that the language used in the description and the illustration of the present invention is descriptive and illustrative and not restrictive. As set forth herein, modifications may be made within the scope of the appended Claims without deviating from the scope or essence of the present invention in its form. Although reference has been made herein to specific structures, materials and examples in the detailed description of the present invention, it is not intended to limit the present invention to the disclosed matters herein, but rather the present invention is to cover all functionally equivalent structures, methods, and uses within the scope of the appended Claims.

The present invention is not limited to the embodiments described in detail above, and various modifications or changes can be made within the scope defined in the Claims of the present invention.

OTHER EMBODIMENTS (1) Examples of vehicles include cars (automobiles), trains, play vehicles, airplanes, helicopters, ships, submarines, and the like.

(2) In the embodiments described above, the video light L is emitted to the projection film 11 while the light-adjusting layer 7 is in the opaque state. However, the video light L may be emitted to the projection film 11 while the light-adjusting layer 7 is in the transparent state, so that it is possible to show the projected video to a person (e.g., pedestrian) outside the vehicle. For example, advertisement can be effectively made to a person outside the vehicle by projecting an advertisement video.

The invention claimed is:

1. A vehicle light-adjusting window comprising:
a transparent plate;
a first conductive film;
a light-adjusting layer;
a second conductive film; and
a projection film,
which are arranged in this order.

2. The vehicle light-adjusting window according to claim 1, further comprising a first resin film,
wherein the first conductive film is provided on the first resin film, and is provided between the first resin film and the light adjusting layer.

3. The vehicle light-adjusting window according to claim 2, further comprising a second resin film,
wherein the second conductive film is provided on the second resin film, and is provided between the second resin film and the light adjusting layer.

4. The vehicle light-adjusting window according to claim 3, further comprising a reflective film arranged between the transparent plate and the first conductive film.

5. The vehicle light-adjusting window according to claim 2, wherein the second conductive film and the projection film are integrated, and the second conductive film is formed on the projection film.

6. The vehicle light-adjusting window according to claim 5, further comprising a reflective film arranged between the transparent plate and the first conductive film.

7. The vehicle light-adjusting window according to claim 2, further comprising a reflective film arranged between the transparent plate and the first conductive film.

8. A vehicle light-adjusting window system comprising:
the vehicle light-adjusting window according to claim 2; and
a projector; wherein
the vehicle light-adjusting window is provided on a vehicle to divide a vehicle exterior and a vehicle interior,
the transparent plate is arranged on a side of the vehicle exterior and the projection film is arranged on a side of the vehicle interior, and
a video is projected onto the projection film by the projector.

9. The vehicle light-adjusting window according to claim 1, further comprising a second resin film,
wherein the second conductive film is provided on the second resin film.

10. The vehicle light-adjusting window according to claim 9, wherein the second conductive film and the projection film are integrated, and the second conductive film is formed on the projection film.

11. The vehicle light-adjusting window according to claim 10, further comprising a reflective film arranged between the transparent plate and the first conductive film.

12. The vehicle light-adjusting window according to claim 9, further comprising a reflective film arranged between the transparent plate and the first conductive film.

13. A vehicle light-adjusting window system comprising:
the vehicle light-adjusting window according to claim 9; and
a projector; wherein
the vehicle light-adjusting window is provided on a vehicle to divide a vehicle exterior and a vehicle interior,
the transparent plate is arranged on a side of the vehicle exterior and the projection film is arranged on a side of the vehicle interior, and
a video is projected onto the projection film by the projector.

14. The vehicle light-adjusting window according to claim 1, wherein the second conductive film and the projection film are integrated, and the second conductive film is formed on the projection film.

15. The vehicle light-adjusting window according to claim 14, further comprising a reflective film arranged between the transparent plate and the first conductive film.

16. A vehicle light-adjusting window system comprising:
the vehicle light-adjusting window according to claim 14; and
a projector; wherein
the vehicle light-adjusting window is provided on a vehicle to divide a vehicle exterior and a vehicle interior,
the transparent plate is arranged on a side of the vehicle exterior and the projection film is arranged on a side of the vehicle interior, and
a video is projected onto the projection film by the projector.

17. The vehicle light-adjusting window according to claim 1, further comprising a reflective film arranged between the transparent plate and the first conductive film.

18. A vehicle light-adjusting window system comprising:
the vehicle light-adjusting window according to claim 1; and
a projector; wherein
the vehicle light-adjusting window is provided on a vehicle to divide a vehicle exterior and a vehicle interior,
the transparent plate is arranged on a side of the vehicle exterior and the projection film is arranged on a side of the vehicle interior, and
a video is projected onto the projection film by the projector.

19. A vehicle light-adjusting window comprising:
a transparent plate;
an adhesive film;
a reflexive film;
a first resin film;
a first conductive film;
a light-adjusting layer;
a second conductive film;
a second resin film; and
a projection film,
which are arranged in this order.

20. A vehicle light-adjusting window comprising:
a transparent plate;
an adhesive film;
a reflexive film;
a first resin film;
a first conductive film;
a light-adjusting layer;
a second conductive film; and
a projection film,
which are arranged in this order.

* * * * *